United States Patent
Ota et al.

(10) Patent No.: US 10,832,829 B2
(45) Date of Patent: Nov. 10, 2020

(54) INSULATED ELECTRIC WIRE AND VARNISH FOR FORMING INSULATING LAYER

(71) Applicants: SUMITOMO ELECTRIC INDUSTRIES, LTD., Osaka (JP); SUMITOMO ELECTRIC WINTEC, INC., Koka (JP)

(72) Inventors: Shinya Ota, Osaka (JP); Shuhei Maeda, Osaka (JP); Hideaki Saito, Osaka (JP); Jun Sugawara, Osaka (JP); Masaaki Yamauchi, Koka (JP); Yasushi Tamura, Koka (JP); Kengo Yoshida, Koka (JP); Yudai Furuya, Koka (JP); Yuji Hatanaka, Koka (JP)

(73) Assignees: SUMITOMO ELECTRIC INDUSTRIES, LTD., Osaka (JP); SUMITOMO ELECTRIC WINTEC, INC., Shiga (JP)

( * ) Notice: Subject to any disclaimer, the term of this patent is extended or adjusted under 35 U.S.C. 154(b) by 88 days.

(21) Appl. No.: 15/550,961

(22) PCT Filed: Oct. 25, 2016

(86) PCT No.: PCT/JP2016/081554
§ 371 (c)(1),
(2) Date: Aug. 14, 2017

(87) PCT Pub. No.: WO2017/073551
PCT Pub. Date: May 4, 2017

(65) Prior Publication Data
US 2018/0033518 A1    Feb. 1, 2018

(30) Foreign Application Priority Data

Oct. 28, 2015    (JP) .................................. 2015-212371

(51) Int. Cl.
*H01B 3/48*    (2006.01)
*H01B 3/44*    (2006.01)
(Continued)

(52) U.S. Cl.
CPC ................ *H01B 3/447* (2013.01); *C08J 9/26* (2013.01); *H01B 3/006* (2013.01); *H01B 3/46* (2013.01);
(Continued)

(58) Field of Classification Search
CPC ................................... H01B 3/30; H01B 3/48
See application file for complete search history.

(56) References Cited

U.S. PATENT DOCUMENTS 2,797,201 A * 6/1957 Veatch ................ C03B 19/1075
106/409
3,615,972 A * 10/1971 Morehouse, Jr. ........ B01J 13/18
156/276
(Continued)

FOREIGN PATENT DOCUMENTS

| CN | 102844822 A | 12/2012 |
| EP | 2568476 A1 | 3/2013 |
| JP | 2012-224714 A | 11/2012 |

*Primary Examiner* — Andrew T Piziali
(74) *Attorney, Agent, or Firm* — Global IP Counselors, LLP

(57) ABSTRACT

An insulated electric wire includes a linear conductor and one or a plurality of insulating layers formed on an outer peripheral surface of the conductor. At least one of the one or plurality of insulating layers contains a plurality of pores, outer shells are disposed on peripheries of the pores, and the outer shells are derived from shells of hollow-forming particles having a core-shell structure. A varnish for forming an insulating layer contains a resin composition forming a matrix and hollow-forming particles having a core-shell structure and dispersed in the resin composition. In the varnish, cores of the hollow-forming particles contain a
(Continued)

thermally decomposable resin as a main component, and shells of the hollow-forming particles contain a main component having a higher thermal decomposition temperature than the thermally decomposable resin.

7 Claims, 3 Drawing Sheets

(51) Int. Cl.
    *H01B 3/00*           (2006.01)
    *C08J 9/26*           (2006.01)
    *H01B 3/46*           (2006.01)
    *H01B 7/02*           (2006.01)
    *H01B 13/06*         (2006.01)
    *H01B 13/16*         (2006.01)
    *H01B 5/00*           (2006.01)

(52) U.S. Cl.
    CPC ........... H01B 7/0208 (2013.01); H01B 13/06 (2013.01); *C08J 2201/046* (2013.01); *C08J 2207/06* (2013.01); *C08J 2377/00* (2013.01); *C08J 2379/08* (2013.01); *C08J 2433/12* (2013.01); *C08J 2483/04* (2013.01); *H01B 5/004* (2013.01); *H01B 7/0233* (2013.01); *H01B 13/16* (2013.01)

(56) References Cited

U.S. PATENT DOCUMENTS

| | | | | |
|---|---|---|---|---|
| 4,730,088 | A * | 3/1988 | Suzuki | H01B 7/0233 174/102 R |
| 5,128,175 | A * | 7/1992 | Yamanishi | H01B 7/0233 427/515 |
| 5,945,043 | A * | 8/1999 | Hamada | B01J 13/043 264/12 |
| 2007/0082190 | A1* | 4/2007 | Endres | C04B 20/1051 428/312.2 |
| 2011/0147043 | A1* | 6/2011 | Perry | H02K 3/30 174/119 C |
| 2014/0033411 | A1* | 2/2014 | Kisailus | B32B 5/12 2/455 |
| 2014/0220343 | A1* | 8/2014 | Choi | H01B 3/18 428/389 |

* cited by examiner ized electric wire that includes a heat-cured film (insulating coating) formed by using an insulating varnish containing a coating film-forming resin and a thermally decomposable resin that is decomposed at a temperature lower than a baking temperature of the coating film-forming resin in order to realize an insulating coating having a low dielectric constant (refer to Japanese Unexamined Patent Application Publication No. 2012-224714). In this insulated electric wire, pores are formed in the heat-cured film by utilizing a phenomenon in which the thermally decomposable resin is thermally decomposed during baking of the coating film-forming resin and the resulting decomposed portions become pores. This formation of the pores enables the insulating coating to have a low dielectric constant.

CITATION LIST

Patent Literature

PTL 1: Japanese Unexamined Patent Application Publication No. 2012-224714

SUMMARY OF INVENTION

An insulated electric wire according to an embodiment of the present invention is an insulated electric wire including a linear conductor and one or a plurality of insulating layers formed on an outer peripheral surface of the conductor. In the insulated electric wire, at least one of the one or plurality of insulating layers contains a plurality of pores, outer shells are disposed on peripheries of the pores, and the outer shells are derived from shells of hollow-forming particles having a core-shell structure.

A varnish for forming an insulating layer according to another embodiment of the present invention is a varnish for forming an insulating layer, the varnish being used for forming an insulating layer that forms an insulated electric wire and containing a resin composition forming a matrix and hollow-forming particles having a core-shell structure and dispersed in the resin composition. In the varnish, cores of the hollow-forming particles contain a thermally decomposable resin as a main component, and shells of the hollow-forming particles contain a main component having a higher thermal decomposition temperature than the thermally decomposable resin.

DESCRIPTION OF EMBODIMENTS

Figure 1:
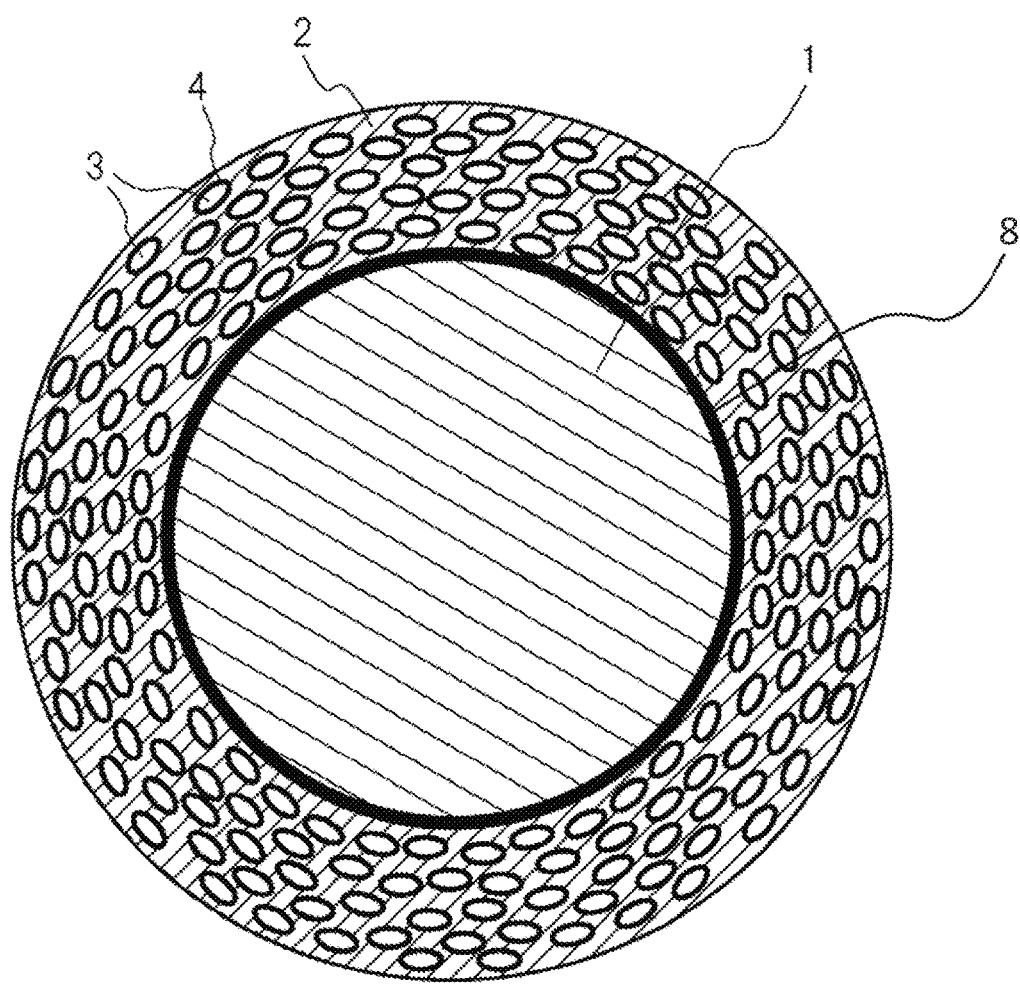
FIG. 1 is a schematic sectional view of an insulated electric wire according to an embodiment of the present invention.

Problem to be Solved by the Disclosure

In the insulated electric wire proposed in the above patent application publication, for example, when the pores formed in the insulating coating are localized or when the sizes of the pores vary, the pores derived from the thermally decomposable resin tend to communicate with each other in the insulating coating, which may result in the generation of pores having a size larger than the particle size of the thermally decomposable resin. The generation of such continuous pores may cause a decrease in strength and solvent resistance of the insulating coating.

The present invention has been made on the basis of the circumstances described above. An object of the present invention is to provide an insulated electric wire and a varnish for forming an insulating layer, the insulated electric wire and the varnish being capable of suppressing a decrease in the strength, insulating property, and solvent resistance of an insulating layer while decreasing the dielectric constant.

Advantageous Effects of the Disclosure

An insulated electric wire and a varnish for forming an insulating layer according to embodiments of the present invention can suppress a decrease in the strength, insulating property, and solvent resistance of an insulating layer while decreasing the dielectric constant.

DESCRIPTION OF EMBODIMENTS OF THE INVENTION

An insulated electric wire according to an embodiment of the present invention is an insulated electric wire including a linear conductor and one or a plurality of insulating layers formed on an outer peripheral surface of the conductor. In the insulated electric wire, at least one of the one or plurality of insulating layers contains a plurality of pores, outer shells are disposed on peripheries of the pores, and the outer shells are derived from shells of hollow-forming particles having a core-shell structure.

In the insulated electric wire, since an insulating layer includes pores and outer shells formed on peripheries of the pores, the pores are unlikely to communicate with each other, and consequently, the size of the pores in the insulating layer is unlikely to vary. In the insulated electric wire, the outer shells are derived from shells of hollow-forming particles having a core-shell structure. That is, since the insulated electric wire includes pores and outer shells obtained by thermal decomposition of cores of the hollow-forming particles having a core-shell structure, communication of the pores is suppressed also during the formation of the pores. Thus, the insulated electric wire can have a higher breakdown voltage than an insulating layer having pores formed by using a single thermally decomposable resin, and has a good insulating property. According to the insulated electric wire, a decrease in strength, an insulating property, and solvent resistance of the insulating layer can be suppressed while the dielectric constant is decreased. Herein, the term "core-shell structure" refers to a structure in which a material forming a core of a particle is different from a material of a shell surrounding the periphery of the core.

At least some of the outer shells preferably have a defect. When at least some of the outer shells have a defect formed as a result of gasification of the thermally decomposable resin of the cores of the hollow-forming particles having a core-shell structure and scattering of the gasified resin to the outside of the shells, the formation of pores is ensured.

The defect is preferably a crack, a gap, or a hole. The defect formed by a crack, a gap, or a hole can enhance the effect of preventing communication of the pores, the effect being exerted by the outer shells.

The pores are preferably flat spheres. When the pores have such a flat shape, the pores are unlikely to come in contact with each other, and independent pores are easily maintained. As a result, a decrease in an insulating property and solvent resistance of the insulating layer is less likely to occur. Herein, the term "flat sphere" refers to a sphere in which a ratio of a minor axis to a major axis is a particular value or less where the major axis represents the maximum length of a diagonal passing through the centroid, and the minor axis represents the minimum length of a diagonal passing through the centroid. The flat sphere is, for example, a sphere having a ratio of the minor axis to the major axis of 0.95 or less on a section including the minor axis and the major axis.

Minor axes of the pores are preferably oriented in a direction perpendicular to the surface of the conductor. When the minor axes of the pores are oriented in a direction perpendicular to the surface of the conductor, communication of pores in the perpendicular direction, in which external force tends to act, can be prevented more reliably. The phrase "oriented in a direction perpendicular to the surface of the conductor" means that the angle formed by the minor axis of a pore and a line extending in a direction perpendicular to the surface of the conductor is 20 degrees or less.

The outer shells preferably contain silicone as a main component. When the outer shells contain silicone as a main component, the outer shells are provided with elasticity, and an insulating property and heat resistance are easily improved. As a result, independent pores surrounded by the outer shells are more easily maintained. Herein, the term "main component" refers to a component having the highest content, and refers to a component contained in an amount of, for example, 50% by mass or more.

A varnish for forming an insulating layer according to an embodiment of the present invention is a varnish for forming an insulating layer, the varnish being used for forming an insulating layer that forms an insulated electric wire and containing a resin composition forming a matrix and hollow-forming particles having a core-shell structure and dispersed in the resin composition. In the varnish, cores of the hollow-forming particles contain a thermally decomposable resin as a main component, and shells of the hollow-forming particles contain a main component having a higher thermal decomposition temperature than the thermally decomposable resin.

The varnish for forming an insulating layer contains hollow-forming particles having a core-shell structure and each including a core containing, as a main component, a thermally decomposable resin and a shell containing, as a main component, a resin having a higher thermal decomposition temperature than the thermally decomposable resin. The thermally decomposable resin of the cores of the hollow-forming particles is gasified by thermal decomposition during baking and scatters through the shells. Consequently, the hollow-forming particles remain after baking in the form of the outer shells each having a hollow inside. Specifically, after baking, the hollow-forming particles change to hollow particles including only the outer shells having a hollow inside, and pores are thus formed in the insulating layer. In the insulating layer obtained by using the varnish for forming an insulating layer, since pores formed in the insulating layer are each surrounded by the outer shell, hollow portions in the hollow particles are unlikely to communicate with each other, and pores larger than the hollow particles are unlikely to generate in the insulating layer. Accordingly, the size of the pores is unlikely to vary. In addition, since an insulating layer having pores formed by hollow particles can have a higher breakdown voltage than an insulating layer having pores formed by using a single thermally decomposable resin, the varnish for forming an insulating layer can provide an insulating layer having a good insulating property. Accordingly, the varnish for forming an insulating layer is capable of suppressing a decrease in strength, an insulating property, and solvent resistance of an insulating layer while decreasing the dielectric constant of an insulated electric wire.

The main component of the shells of the hollow-forming particles is preferably silicone. When the main component of the shells of the hollow-forming particles is silicone, the shells are provided with elasticity, and an insulating property and heat resistance are easily improved. As a result, independent pores due to hollow particles can be more easily maintained.

The thermally decomposable resin is preferably polymethyl methacrylate (PMMA). When the thermally decomposable resin is PMMA, the thermally decomposable resin is easily thermally decomposed at a baking temperature, and pores are easily formed without a residue.

The resin composition preferably contains a polyimide precursor as a main component. When the resin composition contains a polyimide precursor as a main component, application is easily performed, and the strength and heat resistance of the insulating layer are more easily improved.

The hollow-forming particles preferably have a CV value of 30% or less. Use of the hollow-forming particles having a CV value of the upper limit or less enables suppression of a decrease in strength of the insulating layer due to the concentration of processing stress and a decrease in an insulating property due to the concentration of electric charges in pore portions, the concentrations being caused by the difference in the pore size. Herein, the term "CV value" refers to a coefficient of variation specified in JIS-Z8825 (2013).

A varnish for forming an insulating layer according to another embodiment of the present invention is a varnish for forming an insulating layer, the varnish being used for forming an insulating layer that forms the above-described insulated electric wire and containing a resin composition forming a matrix and hollow particles dispersed in the resin composition. In the varnish, outer shells of the hollow particles contain a resin as a main component.

Since the varnish for forming an insulating layer contains hollow particles having outer shells containing a resin as a main component, an insulating layer of the above-described insulated electric wire can be easily and reliably formed.

The main component of the outer shells of the hollow particles is preferably silicone. When the main component of the outer shells of the hollow particles is silicone, the outer shells are provided with elasticity, and an insulating property and heat resistance are easily improved. As a result, independent pores due to the hollow particles are more easily maintained.

DETAILS OF EMBODIMENTS OF THE INVENTION

An insulated electric wire and a varnish for forming an insulating layer according to embodiments of the present invention will now be described with reference to the drawings.

[Insulated Electric Wire]

The insulated electric wire in FIG. 1 includes a linear conductor 1 and a single insulating layer 2 formed on the outer peripheral surface of the conductor 1. The insulating layer 2 contains a plurality of pores 3. The insulated electric wire includes outer shells 4 on the peripheries of the pores 3.

<Conductor>

The conductor 1 is, for example, a round wire having a circular section. Alternatively, the conductor 1 may be a rectangular wire having a rectangular section or a stranded wire obtained by twisting a plurality of element wires together.

The material of the conductor 1 is preferably a metal having high conductivity and high mechanical strength. Examples of such a metal include copper, copper alloys, aluminum, aluminum alloys, nickel, silver, soft iron, steel, and stainless steel. Examples of the conductor 1 that can be used include materials obtained by forming any of these metals to have a linear shape, materials having a multilayer structure obtained by coating such a linear material with another metal, such as a nickel-coated copper wire, a silver-coated copper wire, a copper-coated aluminum wire, and a copper-coated steel wire.

The lower limit of the average sectional area of the conductor 1 is preferably 0.01 mm$^2$, and more preferably 0.1 mm$^2$. The upper limit of the average sectional area of the conductor 1 is preferably 20 mm$^2$, and more preferably 10 mm$^2$. When the average sectional area of the conductor 1 is less than the lower limit, the volume of the insulating layer 2 relative to that of the conductor 1 becomes large, which may result in a decrease in the volumetric efficiency of a coil or the like formed by using the insulated electric wire. On the other hand, when the average sectional area of the conductor 1 is more than the upper limit, it is necessary to form an insulating layer 2 having a large thickness in order to sufficiently decrease the dielectric constant, and the insulated electric wire may have an unnecessarily large diameter.

<Insulating Layer>

As illustrated in FIG. 1, the insulating layer 2 contains a plurality of pores 3 derived from hollow-forming particles having a core-shell structure described below.

The insulating layer 2 is formed of a resin composition having an insulating property, the pores 3 disposed in the resin composition in a dispersed manner, and outer shells 4 on the peripheries of the pores 3. This insulating layer 2 is formed by applying a varnish for forming an insulating layer described below to the outer peripheral surface of the conductor 1, and baking the varnish.

Figure 2:
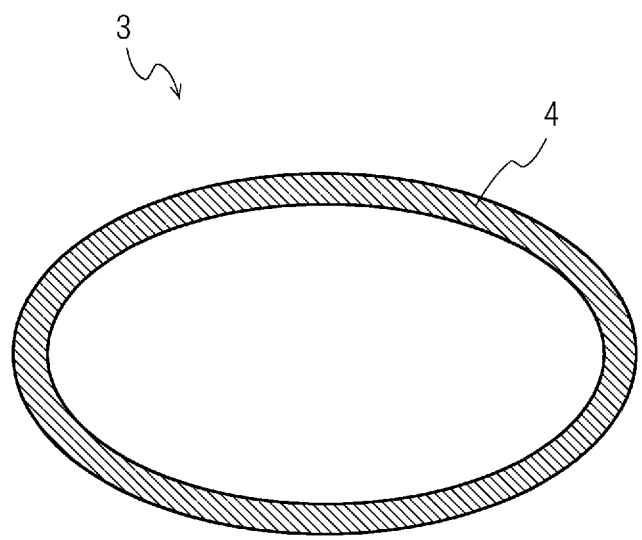
FIG. 2 is a schematic sectional view of a pore and an outer shell that are included in the insulated electric wire in FIG. 1.

Each of the pores 3 is covered with an outer shell 4, as illustrated in FIG. 2. This outer shell 4 is constituted by a shell 7 after baking, the shell 7 becoming hollow as a result of removal of a core 6 of a hollow-forming particle 5 having a core-shell structure illustrated in FIG. 3. Specifically, the outer shells 4 are derived from the shells 7 of the hollow-forming particles 5 having a core-shell structure. Furthermore, at least some of the plurality of outer shells 4 have a defect.

The pores 3 are flat spheres, as illustrated in FIG. 1. When the minor axes of the pores 3 are oriented in a direction perpendicular to the surface of the conductor 1, the pores are unlikely to come in contact with each other in the perpendicular direction, in which external force tends to act, and thus independent pores are more easily maintained. Therefore, the higher the percentage of pores 3 whose minor axes are oriented in the direction perpendicular to the surface of the conductor 1, the more preferable. The lower limit of the percentage of the number of pores 3 whose minor axes are oriented in the direction perpendicular to the surface of the conductor 1 to the total number of pores 3 is preferably 60%, and more preferably 80%. When the percentage of pores 3 whose minor axes are oriented in the direction perpendicular to the surface of the conductor 1 is less than the lower limit, the number of pores 3 that come in contact with each other increases, and the generation of continuous pores may not be sufficiently suppressed.

The lower limit of the average of a ratio of the length of the minor axis to the length of the major axis on a section including the minor axis and the major axis of the pores 3 is preferably 0.2, and more preferably 0.3. The upper limit of the average of the ratio is preferably 0.95, and more preferably 0.9. When the average of the ratio is less than the lower limit, it is necessary to increase the amount of shrinkage in the thickness direction during baking of the varnish, which may result in a decrease in flexibility of the insulated electric wire. In contrast, when the average of the ratio is more than the upper limit, in the case of a high porosity, the pores easily come in contact with each other in the thickness direction of the insulating layer 2, in which external force tends to act, and the effect of suppressing communication of the pores 3 may not be sufficiently provided. The ratio can be adjusted by changing the pressure applied to the hollow-forming particles 5 due to shrinkage of the resin composition during baking, the resin composition being contained in the varnish for forming an insulating layer. The pressure applied to the hollow-forming particles 5 can be changed by, for example, the type of material serving as a main component of the resin composition, the thickness of the insulating layer 2, the material of the hollow-forming particles 5, and baking conditions.

The lower limit of the average of the major axis of the pores 3 is not particularly limited but is, for example, 0.1 μm, and more preferably 1 μm. The upper limit of the average of the major axis is preferably 10 μm, and more preferably 8 μm. When the average of the major axis is less than the lower limit, a desired porosity of the insulating layer 2 may not be obtained. On the other hand, when the average of the major axis is more than the upper limit, the distribution of the pores 3 in the insulating layer 2 is unlikely to be uniform, which may easily cause unevenness of the distribution of the dielectric constant.

Figure 3:
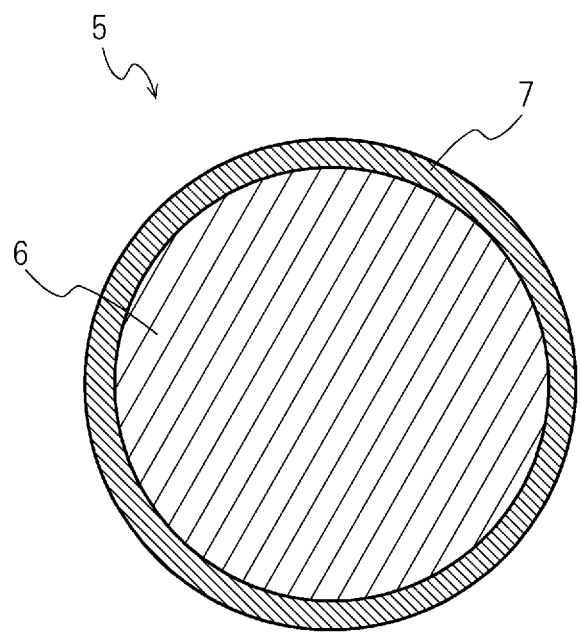
FIG. 3 is a schematic sectional view of a hollow-forming particle contained in a varnish for forming an insulating layer, the varnish being used for forming the insulated electric wire in FIG. 1.

At least some of the plurality of outer shells 4 present on the peripheries of the pores 3 have a defect. The pores 3 and the outer shells 4 are derived from hollow-forming particles 5 each having a core 6 containing a thermally decomposable resin as a main component and a shell 7 having a higher thermal decomposition temperature than the thermally decomposable resin, as illustrated in FIG. 3. Specifically, during baking of the varnish containing the hollow-forming particles 5, the thermally decomposable resin, which is a main component of the cores 6, is gasified by thermal decomposition and scatters through the shells 7 to thereby form the pores 3 and the outer shells 4. At this time, paths of the thermally decomposable resin in the shells 7 are present as defects in the outer shells 4. The shapes of the defects change depending on the material and the shape of the shell 7. The defects are preferably cracks, gaps, and holes from the viewpoint of enhancing the effect of preventing the pores 3 from communicating with each other, the effect being exerted by the outer shells 4.

The insulating layer 2 may include outer shells 4 free of defects. Under some conditions for a flow of the thermally decomposable resin of the cores 6 to the outside of the shells 7, defects may not be formed in the outer shells 4. The insulating layer 2 may contain pores 3 that are not covered with the outer shells 4.

The lower limit of the average thickness of the insulating layer 2 is preferably 5 μm, and more preferably 10 μm. The upper limit of the average thickness of the insulating layer 2 is preferably 200 μm, and more preferably 100 μm. When the average thickness of the insulating layer 2 is less than the lower limit, the insulating layer 2 may be torn, and insulation of the conductor 1 may become insufficient. On the other hand, when the average thickness of the insulating layer 2 is more than the upper limit, the volumetric efficiency of a coil or the like formed by using the insulated electric wire may decrease.

The lower limit of the porosity of the insulating layer 2 is preferably 5% by volume, and more preferably 10% by volume. The upper limit of the porosity of the insulating layer 2 is preferably 80% by volume, and more preferably 50% by volume. When the porosity of the insulating layer 2 is less than the lower limit, the dielectric constant of the insulating layer 2 does not sufficiently decrease, and the corona inception voltage may not be sufficiently improved. On the other hand, when the porosity of the insulating layer 2 is more than the upper limit, mechanical strength of the insulating layer 2 may not be maintained. Herein, the term "porosity" refers to the percentage of the volume of pores relative to the volume of an insulating layer including the pores.

The upper limit of a ratio of the dielectric constant of the insulating layer 2 relative to the dielectric constant of a layer that is formed of the same material as the insulating layer 2 and that is free of pores is 95%, preferably 90%, and more preferably 80%. When the ratio of the dielectric constant is more than the upper limit, the corona inception voltage may not be sufficiently improved.

In the insulated electric wire, the pores 3 included in the insulating layer 2 are thus surrounded by the outer shells 4, and the pores 3 are unlikely to communicate with each other even when the outer shells 4 come in contact with each other. Thus, coarse pores are unlikely to generate. With this structure, the insulated electric wire enables the porosity of the insulating layer 2 to increase while suppressing a decrease in an insulating property and solvent resistance.

In the insulated electric wire, since the pores 3 are flat spheres, the pores 3 are unlikely to come in contact with each other. Thus, independent pores due to the pores 3 are easily maintained.

[Varnish for Forming Insulating Layer]

First Embodiment

The varnish for forming an insulating layer is a varnish used for forming the insulating layer 2 of the insulated electric wire. The varnish for forming an insulating layer according to a first embodiment contains a resin composition forming a matrix, and hollow-forming particles 5 having a core-shell structure and dispersed in the resin composition. In the varnish, cores 6 of the hollow-forming particles 5 contain a thermally decomposable resin as a main component, and shells 7 of the hollow-forming particles 5 contain a main component having a higher thermal decomposition temperature than the thermally decomposable resin.

(Resin Composition)

The resin composition is a composition containing, for example, a main polymer, a diluting solvent, and a curing agent. The main polymer is not particularly limited. When a thermosetting resin is used, examples of the main polymer include polyvinylformal precursors, thermosetting polyurethane precursors, thermosetting acrylic resin precursors, epoxy resin precursors, phenoxy resin precursors, thermosetting polyester precursors, thermosetting polyester-imide precursors, thermosetting polyester-amide-imide precursors, thermosetting polyamide-imide precursors, and polyimide precursors. When a thermoplastic resin is used, examples of the main polymer include polyetherimides, polyether ether ketones, polyether sulfones, and polyimides. Among these, polyimide precursors are preferred from the viewpoint of the ease of application of the varnish for forming an insulating layer and the ease of improvement in the strength and heat resistance of the insulating layer 2.

The diluting solvent may be selected from known organic solvents that have been used for insulating varnishes. Specific examples thereof include polar organic solvents such as N-methyl-2-pyrrolidone, N,N-dimethylacetamide, N,N-dimethylformamide, dimethyl sulfoxide, tetramethylurea, hexaethylphosphoric triamide, and γ-butyrolactone; ketones such as acetone, methyl ethyl ketone, methyl isobutyl ketone, and cyclohexanone; esters such as methyl acetate, ethyl acetate, butyl acetate, and diethyl oxalate; ethers such as diethyl ether, ethylene glycol dimethyl ether, diethylene glycol monomethyl ether, ethylene glycol monobutyl ether (butyl cellosolve), diethylene glycol dimethyl ether, and tetrahydrofuran; hydrocarbons such as hexane, heptane, benzene, toluene, and xylene; halogenated hydrocarbons such as dichloromethane and chlorobenzene; phenols such as cresol and chlorophenol; and tertiary amines such as pyridine. These organic solvents may be used alone or as a mixture of two or more thereof.

The resin composition may contain a curing agent. Examples of the curing agent include titanium-based curing agents, isocyanate compounds, blocked isocyanates, urea and melamine compounds, amino resins, acetylene derivatives, alicyclic acid anhydrides such as methyltetrahydrophthalic anhydride, aliphatic acid anhydrides, and aromatic acid anhydrides. These curing agents are appropriately selected in accordance with the type of the main polymer contained in the resin composition used. For example, in the case of a polyamide-imide, for example, imidazole or triethylamine is preferably used as the curing agent.

Examples of the titanium-based curing agents include tetrapropyl titanate, tetraisopropyl titanate, tetramethyl titanate, tetrabutyl titanate, and tetrahexyl titanate.

Examples of the isocyanate compounds include aromatic diisocyanates such as tolylene diisocyanate (TDI), diphenylmethane diisocyanate (MDI), p-phenylene diisocyanate, and naphthalene diisocyanate; aliphatic diisocyanates each having 3 to 12 carbon atoms such as hexamethylene diisocyanate (HDI), 2,2,4-trimethylhexane diisocyanate, and lysine diisocyanate; alicyclic diisocyanates each having 5 to 18 carbon atoms such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidene dicyclohexyl-4,4'-diisocyanate, 1,3-diisocyanatomethyl cyclohexane (hydrogenated XDI), hydrogenated TDI, 2,5-bis(isocyanatomethyl)-bicyclo[2.2.1]heptane, and 2,6-bis(isocyanatomethyl)-bicyclo[2.2.1]heptane; aromatic ring-containing aliphatic diisocyanates such as xylylene diisocyanate (XDI) and tetramethylxylylene diisocyanate (TMXDI); and modified products of these diisocyanates.

Examples of the blocked isocyanates include diphenylmethane-4,4'-diisocyanate (MDI), diphenylmethane-3,3'-diisocyanate, diphenylmethane-3,4'-diisocyanate, diphenyl ether-4,4'-diisocyanate, benzophenone-4,4'-diisocyanate, diphenyl sulfone-4,4'-diisocyanate, tolylene-2,4-diisocyanate, tolylene-2,6-diisocyanate, naphthylene-1,5-diisocyanate, m-xylylene diisocyanate, and p-xylylene diisocyanate.

Examples of the melamine compounds include methylated melamine, butylated melamine, methylolated melamine, and butylolated melamine. Examples of the acetylene derivatives include ethynylaniline and ethynylphthalic anhydride.

(Hollow-Forming Particle)

As illustrated in FIG. 3, the hollow-forming particle 5 includes a core 6 containing a thermally decomposable resin as a main component and a shell 7 having a higher thermal decomposition temperature than the thermally decomposable resin.

(Core)

An example of the thermally decomposable resin used as the main component of the core 6 is a resin particle that is thermally decomposed at a temperature lower than a baking temperature of the main polymer. The baking temperature of the main polymer is appropriately determined in accordance with the type of the resin and is usually about 200° C. or higher and 600° C. or lower. Accordingly, the lower limit of the thermal decomposition temperature of the thermally decomposable resin used for the core 6 of the hollow-forming particle 5 is preferably 200° C., and the upper limit of the thermal decomposition temperature is preferably 400° C. Herein, the term "thermal decomposition temperature" refers to a temperature at which the mass is reduced by 50% when the temperature is increased from room temperature at a rate of 10° C./min in an air atmosphere. The thermal decomposition temperature can be determined by, for example, thermogravimetry using a thermogravimetry-differential thermal analyzer ("TG/DTA" available from SII NanoTechnology Inc.).

Examples of the thermally decomposable resin used for the core 6 of the hollow-forming particle 5 include, but are not particularly limited to, compounds obtained by alkylation, (meth)acrylation, or epoxidation of one terminal, two terminals, or a part of polyethylene glycol, polypropylene glycol, or the like; polymers of (meth)acrylic acid esters having an alkyl group with 1 to 6 carbon atoms, such as polymethyl (meth)acrylate, polyethyl (meth)acrylate, polypropyl (meth)acrylate, and polybutyl (meth)acrylate; urethane oligomers; urethane polymers; and polymers of modified (meth)acrylates such as urethane (meth)acrylates, epoxy (meth)acrylates, and ε-caprolactone (meth)acrylates; poly (meth)acrylic acid; cross-linked products thereof; polystyrene; and cross-linked polystyrene. Among these, polymers of (meth)acrylic acid esters having an alkyl group with 1 to 6 carbon atoms are preferred from the viewpoint that these polymers easily thermally decompose at the baking temperature of the main polymer to easily form the pores 3 in the insulating layer 2. An example of such a polymer of a (meth)acrylic acid ester is polymethyl methacrylate (PMMA).

The shape of the core 6 is preferably a spherical shape. For example, a spherical, thermally decomposable resin particle may be used as the core 6 so that the core 6 has a spherical shape. When spherical, thermally decomposable resin particles are used, the lower limit of the mean particle size of the resin particles is not particularly limited, but is, for example, preferably 0.1 μm, more preferably 0.5 μm, and still more preferably 1 μm. The upper limit of the mean particle size of the resin particles is preferably 15 μm, and more preferably 10 μm. When the mean particle size of the resin particles is less than the lower limit, it may become difficult to prepare hollow-forming particles 5 including the resin particles as the cores 6. On the other hand, when the mean particle size of the resin particles is more than the upper limit, hollow-forming particles 5 including the resin particles as the cores 6 have an excessively large size. Thus, the distribution of the pores 3 in the insulating layer 2 is unlikely to be uniform, and the distribution of the dielectric constant may tend to be uneven. Herein, the term "mean particle size" of the resin particles refers to a particle size exhibiting the highest volume content in a particle size distribution measured with a laser diffraction particle size distribution analyzer.

As the main component of the shell 7, a material having a higher thermal decomposition temperature than the thermally decomposable resin is used. The main component of the shell 7 is preferably a material having a low dielectric constant and high heat resistance. Examples of such a material used as the main component of the shell 7 include resins such as polystyrene, silicone, fluororesins, and polyimides. Among these resins, silicone is preferred from the viewpoint of imparting elasticity to the shell 7 and easily improving an insulating property and heat resistance. Herein, the term "fluororesin" refers to a resin in which at least one hydrogen atom bonded to a carbon atom forming a repeating unit of the polymer chain is substituted with a fluorine atom or an organic group having a fluorine atom (hereinafter, may be referred to as a "fluorine atom-containing group"). The fluorine atom-containing group is a group in which at least one hydrogen atom in a linear or branched organic group is substituted with a fluorine atom. Examples of the fluorine atom-containing group include fluoroalkyl groups, fluoroalkoxy groups, and fluoropolyether groups.

The shell 7 may contain a metal within a range in which an insulating property is not impaired.

The resin used as the main component of the shell 7 may be the same as or different from the main polymer of the resin composition incorporated in the varnish for forming an insulating layer. For example, even when a resin the same as the main polymer of the resin composition is used as the resin of the main component of the shell 7, the effect of suppressing communication of the pores 3 is provided. This is because, since the resin of the main component of the shell 7 has a higher thermal decomposition temperature than the thermally decomposable resin, the resin of the main component of the shell 7 is unlikely to decompose even when the thermally decomposable resin is gasified. With regard to the insulated electric wire formed by using such a varnish for forming an insulating layer, the presence of the shell 7 may not be confirmed even by observation with an electron microscope. In contrast, when a resin different from the main polymer of the resin composition is used as the resin of the main component of the shell 7, the likelihood of the shell 7 being integrated with the resin composition can be reduced. Consequently, the effect of suppressing communication of the pores 3 is easily provided compared with the case where a resin the same as the main polymer of the resin composition is used.

The lower limit of the average thickness of the shell 7 is not particularly limited but is, for example, preferably 0.01 μm, and more preferably 0.02 μm. The upper limit of the average thickness of the shell 7 is preferably 0.5 μm, and more preferably 0.4 μm. When the average thickness of the shell 7 is less than the lower limit, the effect of suppressing communication of the pores 3 may not be sufficiently provided. On the other hand, when the average thickness of the shell 7 is more than the upper limit, the pores 3 have an excessively small volume, and thus the porosity of the insulating layer 2 may not be increased to a predetermined value or more. The shell 7 may be formed of either a single layer or a plurality of layers. When the shell 7 is formed of a plurality of layers, the average of the total thickness of the layers may be in the above-described range of the thickness.

The upper limit of the CV value of the hollow-forming particles 5 is preferably 30%, and more preferably 20%. When the CV value of the hollow-forming particles 5 is more than the upper limit, the insulating layer 2 contains a plurality of pores 3 having different sizes, which may easily cause unevenness of the distribution of the dielectric constant. The lower limit of the CV value of the hollow-forming particles 5 is not particularly limited, but is, for example, preferably 1%. When the CV value of the hollow-forming particles 5 is less than the lower limit, the cost of the hollow-forming particles 5 may become excessively high.

The hollow-forming particle 5 may have a structure in which the core 6 is formed of a single thermally decomposable resin particle, as illustrated in FIG. 3. Alternatively, the thermally decomposable resin particle 5 may have a structure in which the core 6 is formed of a plurality of thermally decomposable resin particles, and these thermally decomposable resin particles are covered with the resin of the shell 7.

The surface of the hollow-forming particle 5 may be smooth without irregularities, as illustrated in FIG. 3. Alternatively, the hollow-forming particle 5 may have irregularities on the surface thereof.

The lower limit of the resin solid content of the varnish for forming an insulating layer, the varnish being prepared by performing dilution with the organic solvent and dispersing the hollow-forming particles 5, is preferably 15% by mass, and more preferably 20% by mass. The upper limit of the resin solid content of the varnish for forming an insulating layer is preferably 50% by mass, and more preferably 30% by mass. When the resin solid content of the varnish for forming an insulating layer is less than the lower limit, a layer that can be formed by applying the varnish once has a small thickness. Accordingly, the number of times of repetition of a varnish application step for forming an insulating layer 2 having a desired thickness increases, which may result in an increase in the time of the varnish application step. On the other hand, when the resin solid content of the varnish for forming an insulating layer is more than the upper limit, the resulting varnish thickens, which may decrease storage stability of the varnish.

In order to form pores, in addition to the hollow-forming particles 5, a pore-forming agent such as thermally decomposable particles may be incorporated in the varnish for forming an insulating layer. Alternatively, in order to form pores, the varnish for forming an insulating layer may be prepared by using diluting solvents having different boiling points in combination. The pores formed by the pore-forming agent and the pores formed by the combination of diluting solvents having different boiling points are unlikely to communicate with the pores derived from the hollow-forming particles 5. Accordingly, even when pores that are not covered with the outer shells 4 are thus included, the generation of coarse pores in the insulating layer 2 is suppressed by the presence of the pores covered with the outer shells 4.

Second Embodiment

The varnish for forming an insulating layer according to a second embodiment is a varnish used for forming the insulating layer of the insulated electric wire as in the varnish for forming an insulating layer of the first embodiment. The varnish for forming an insulating layer of the second embodiment contains a resin composition forming a matrix, and hollow particles dispersed in the resin composition. In the varnish, outer shells of the hollow particles contain a resin as a main component.

The resin composition of the varnish for forming an insulating layer may be the same as that of the varnish for forming an insulating layer of the first embodiment.

Examples of the resin of the main component of the hollow particles include polystyrene, silicone, fluororesins, and polyimides. Among these resins, silicone is preferred from the viewpoint of imparting elasticity to the outer shells and easily improving an insulating property and heat resistance.

The lower limit of the average inner diameter of the hollow particles is not particularly limited, but is, for example, 0.1 μm, more preferably 0.5 μm, and still more preferably 1 μm. The upper limit of the average inner diameter of the hollow particles is 15 μm, and more preferably 10 μm. When the average inner diameter of the hollow particles is less than the lower limit, an insulating layer having a desired porosity may not be obtained. On the other hand, when the average inner diameter of the hollow particles is more than the upper limit, the distribution of pores in the insulating layer is unlikely to be uniform, which may easily cause unevenness of the distribution of the dielectric constant.

The lower limit of the average thickness of the outer shells of the hollow particles is not particularly limited, but is, for example, preferably 0.01 μm, and more preferably 0.02 μm. The upper limit of the average thickness of the outer shells is preferably 0.5 μm, and more preferably 0.4 μm. When the average thickness of the outer shells is less than the lower limit, the effect of suppression communication of pores may not be sufficiently provided. On the other hand, when the average thickness of the outer shells is more than the upper limit, the pores have an excessively small volume, and thus the porosity of the insulating layer may not be increased to a predetermined value or more. The outer shells may each be formed of either a single layer or a plurality of layers. When the outer shell is formed of a plurality of layers, the average of the total thickness of the layers may be in the above-described range of the thickness.

The CV value of the hollow particles may be the same as that of the hollow-forming particles of the varnish for forming an insulating layer of the first embodiment.

The varnish for forming an insulating layer is obtained by heating the varnish for forming an insulating layer of the first embodiment. Specifically, the varnish for forming an insulating layer of the first embodiment is heated to thereby remove the thermally decomposable resin of the cores of the hollow-forming particles by gasification, thus obtaining the hollow particles of this embodiment.

[Method for Producing Insulated Electric Wire]

Next, a method for producing the insulated electric wire will be described. The method for producing the insulated electric wire includes a step of preparing a varnish for forming an insulating layer by dispersing hollow-forming particles 5 having a core-shell structure in a resin composition obtained by diluting a main polymer for forming the insulating layer 2 with a solvent (varnish preparation step); a step of applying the varnish for forming an insulating layer to an outer peripheral surface of the conductor 1 (varnish application step); and a step of heating to remove cores 6 of the hollow-forming particles 5 (heating step).

<Varnish Preparation Step>

In the varnish preparation step, a resin composition for forming a matrix of an insulating layer 2 is first prepared by diluting a main polymer forming the insulating layer 2 with a solvent. Subsequently, hollow-forming particles 5 are dispersed in the resin composition to prepare a varnish for forming an insulating layer. Note that the varnish for forming an insulating layer may be prepared by mixing the hollow-forming particles 5 at the same time when the main polymer is diluted with the solvent instead of dispersing the hollow-forming particles 5 in the resin composition.

<Varnish Application Step>

In the varnish application step, the varnish for forming an insulating layer prepared in the varnish preparation step is applied to an outer peripheral surface of a conductor 1, and adjustment of the amount of varnish applied to the conductor 1 and smoothing of the surface of the applied varnish are conducted with a coating die.

The coating die has an opening, and the conductor 1 coated with the varnish for forming an insulating layer passes through this opening to thereby remove the excess varnish and to adjust the amount of varnish applied. As a result, the insulated electric wire includes the insulating layer 2 having a uniform thickness, and thus uniform electrical insulating properties are obtained.

<Heating Step>

Subsequently, in the heating step, the conductor 1 coated with the varnish for forming an insulating layer is allowed to pass through a baking furnace to bake the varnish for forming an insulating layer. Thus, the insulating layer 2 is formed on the surface of the conductor 1. During the baking, the thermally decomposable resin of the cores 6 of the hollow-forming particles 5 contained in the varnish for forming an insulating layer is gasified by thermal decomposition, and this gasified thermally decomposable resin scatters through the shells 7. Thus, the cores 6 of the hollow-forming particles 5 are removed by heating during the baking. As a result, hollow particles (particles formed of outer shells alone) derived from the hollow-forming particles 5 are formed in the insulating layer 2, and pores 3 due to these hollow particles are formed in the insulating layer 2. The heating step also serves as a step of baking the varnish for forming an insulating layer, as described above.

The insulated electric wire is obtained by repeating the varnish application step and the heating step until the thickness of the insulating layer 2 formed on the surface of the conductor 1 becomes a predetermined value.

The insulating layer 2 thus prepared by using the varnish for forming an insulating layer contains the pores 3 derived from the hollow-forming particles 5. Since the pores 3 are surrounded by the outer shells 4, the pores are unlikely to communicate with each other, and coarse pores are unlikely to be generated even when the number of pores is increased so as to increase the porosity of the insulating layer 2. In addition, the breakdown voltage of the insulating layer 2 including the pores 3 surrounded by the outer shells 4 can be made higher than that of an insulating layer including pores formed by a single thermally decomposable resin. Accordingly, the varnish for forming an insulating layer can suppress a decrease in insulating properties. Thus, use of the varnish for forming an insulating layer enables an increase in the porosity of the insulating layer 2 while suppressing a decrease in an insulating property and solvent resistance.

The heating step may be performed before the varnish preparation step. In this case, for example, the hollow-forming particles 5 are heated by using a thermostatic chamber or the like to gasify the thermally decomposable resin of the cores 6 by thermal decomposition. Thus, hollow particles from which the cores 6 have been removed are obtained. In the varnish preparation step, a varnish for forming an insulating layer is prepared by dispersing the hollow particles in the resin composition that forms the matrix of the insulating layer 2. The hollow structure of the hollow particles from which the cores 6 have been removed is maintained also after the application and baking of this varnish for forming an insulating layer. Accordingly, application and baking of the varnish for forming an insulating layer enables formation of the insulating layer 2 including the pores 3 due to the hollow particles. However, in the case where the heating step is performed before the varnish preparation step, a step of baking the varnish for forming an insulating layer is performed after the varnish application step in addition to the heating step.

In the case where the heating step is performed before the varnish preparation step as described above, the cores 6 are removed easily compared with the case where the cores 6 of the hollow-forming particles 5 are removed by heating during baking. Therefore, pores can be formed in the insulating layer 2 more reliably, and foaming of the insulating layer 2 due to decomposition gas of the thermally decomposable resin can be suppressed.

OTHER EMBODIMENTS

It is to be understood that the embodiments disclosed herein are only illustrative and are not restrictive in all respects. The scope of the present invention is not limited to the configurations of the embodiments and is defined by the claims described below. The scope of the present invention is intended to cover all the modifications within the meaning and range of equivalents of the claims.

In the embodiments, a description has been made of an insulated electric wire in which a single insulating layer is formed on the outer peripheral surface of a conductor. Alternatively, the insulated electric wire may have a structure in which a plurality of insulating layers are formed on the outer peripheral surface of a conductor. Specifically, one or a plurality of insulating layers may be formed between the conductor 1 and the insulating layer 2 including the pores 3 in FIG. 1. Alternatively, one or a plurality of insulating layers may be formed on the outer peripheral surface of the insulating layer 2 including the pores 3 in FIG. 1. Alternatively, one or a plurality of insulating layers may be formed on each of the outer peripheral surface and the inner peripheral surface of the insulating layer 2 including the pores 3 in FIG. 1. In such an insulated electric wire including a plurality of insulating layers, at least one insulating layer contains pores surrounded by outer shells (pores due to hollow particles). That is, two or more insulating layers may contain pores due to hollow particles. When two or more insulating layers contain pores due to hollow particles, each of the insulating layers contributes to the realization of a low dielectric constant. Insulated electric wires in which at least one of a plurality of insulating layers is formed by using the above-described varnish for forming an insulating layer are also covered by the scope intended by the present invention. In addition, the formation of a plurality of insulating layers on the outer peripheral surface of a conductor enables improvement in mechanical strength of the insulated electric wire. Resin compositions used for forming the plurality of insulating layers may be the same or different from each other.

In the above embodiments, a description has been made of an insulated electric wire in which pores contained in an insulating layer are flat spheres. However, the pores are not limited to flat spheres. For example, pores surrounded by outer shells may be non-flat polyhedrons or spheres. Even when the pores have such shapes, the pores are unlikely to communicate with each other due to the presence of the outer shells, and thus coarse pores are unlikely to be generated in the insulating layer. Accordingly, even in the case of pores having such shapes, the porosity of the insulating layer can be increased while suppressing a decrease in an insulating property and solvent resistance of the insulated electric wire.

In the insulated electric wire, for example, an additional layer such as a primer treatment layer 8 may be further disposed between the conductor and the insulating layer. The primer treatment layer 8 is provided in order to enhance adhesiveness between layers and can be formed by using, for example, a known resin composition.

In the case where a primer treatment layer 8 is provided between the conductor and an insulating layer, the resin composition for forming the primer treatment layer 8 preferably contains one or a plurality of resins selected from, for example, polyimides, polyamide-imides, polyester-imides, polyesters, and phenoxy resins. The resin composition for forming the primer treatment layer 8 may contain an additive such as an adhesion improver. Formation of a primer treatment layer 8 formed of such a resin composition between a conductor and an insulating layer enables improvement in adhesiveness between the conductor and an insulating layer. As a result, properties of the insulated electric wire, such as flexibility, abrasion resistance, scratch resistance, and process resistance can be effectively increased.

The resin composition for forming the primer treatment layer 8 may contain, in addition to the resins mentioned above, other resins such as epoxy resins, phenoxy resins, and melamine resins. Commercially available liquid compositions (insulating varnishes) may be used as the resins contained in the resin composition for forming the primer treatment layer 8.

The lower limit of the average thickness of the primer treatment layer 8 is preferably 1 μm, and more preferably 2 μm. The upper limit of the average thickness of the primer treatment layer 8 is preferably 30 μm, and more preferably 20 μm. When the average thickness of the primer treatment layer 8 is less than the lower limit, sufficient adhesiveness to the conductor may not be exhibited. On the other hand, when the average thickness of the primer treatment layer 8 is more than the upper limit, the insulated electric wire may have an excessively large diameter.

Example 1

The present invention will now be described in more detail by way of Examples. However, the present invention is not limited to these Examples.

EXAMPLES

An insulated electric wire described as No. 1 in Table 1 was produced as an Example in the following manner. First, copper was cast, stretched, subjected to wire drawing, and softened to obtain a conductor having a circular section and an average diameter of 1 mm. A resin composition was prepared by using a polyimide as a main polymer and N-methyl-2-pyrrolidone as a solvent. The resin composition was obtained by diluting the main polymer with the solvent. Core-shell composite particles including cores formed of PMMA particles and shells formed of silicone and having a mean particle size of 3 μm were used as hollow-forming particles. The hollow-forming particles were then dispersed in the resin composition in such an amount that the resulting insulating layer had a calculated porosity of 20% by volume to prepare a varnish for forming an insulating layer. The varnish for forming an insulating layer was applied to the outer peripheral surface of the conductor and baked at a linear velocity of 2.5 m/min, at a furnace inlet temperature of 350° C., and at a furnace outlet temperature of 450° C. to form an insulating layer. Thus, an insulated electric wire of No. 1 was obtained. The insulating layer was a single layer and had an average thickness of 30 μm. The insulating layer of this insulated electric wire included pores surrounded by outer shells having defects (cracks).

An insulated electric wire of No. 2 was obtained as an Example by the same method as that used in the insulated electric wire described as No. 1 except that a varnish prepared by dispersing the hollow-forming particles in the resin composition in such an amount that the resulting insulating layer had a calculated porosity of 40% by volume was used as the varnish for forming an insulating layer. The insulating layer of this insulated electric wire included pores surrounded by outer shells having defects (cracks).

An insulated electric wire of No. 3 was obtained as an Example by the same method as that used in the insulated electric wire described as No. 1 except that a varnish prepared by dispersing the hollow-forming particles in the resin composition in such an amount that the resulting insulating layer had a calculated porosity of 50% by volume was used as the varnish for forming an insulating layer. The insulating layer of this insulated electric wire included pores surrounded by outer shells having defects (cracks).

COMPARATIVE EXAMPLES

The resin composition that did not contain hollow-forming particles was used as a varnish for forming an insulating layer. This varnish was applied to the outer peripheral surface of the conductor and baked to form an insulating layer. Thus, an insulated electric wire of No. 4 including an insulating layer free of pores was obtained as a Comparative Example.

An insulated electric wire of No. 5 was obtained as a Comparative Example by the same method as that used in the insulated electric wire described as No. 1 except that a varnish prepared by dispersing PMMA particles in the resin composition in such an amount that the resulting insulating layer had a calculated porosity of 10% by volume was used as the varnish for forming an insulating layer. The varnish for forming an insulating layer used here was prepared by using, as the particles dispersed in the resin composition, thermally decomposable resin particles instead of the hollow-forming particles used in No. 1. Specifically, PMMA particles having a mean particle size of 2.5 μm were used as the thermally decomposable resin particles.

An insulated electric wire of No. 6 was obtained as a Comparative Example by the same method as that used in the insulated electric wire described as No. 5 except that a varnish prepared by dispersing the PMMA particles in the resin composition in such an amount that the resulting insulating layer had a calculated porosity of 20% by volume was used as the varnish for forming an insulating layer.

An insulated electric wire of No. 7 was obtained as a Comparative Example by the same method as that used in the insulated electric wire described as No. 5 except that a varnish prepared by dispersing the PMMA particles in the resin composition in such an amount that the resulting insulating layer had a calculated porosity of 30% by volume was used as the varnish for forming an insulating layer.

An insulated electric wire of No. 8 was obtained as a Comparative Example by the same method as that used in the insulated electric wire described as No. 5 except that a varnish prepared by dispersing the PMMA particles in the resin composition in such an amount that the resulting insulating layer had a calculated porosity of 40% by volume was used as the varnish for forming an insulating layer.

An insulated electric wire of No. 9 was obtained as a Comparative Example by the same method as that used in the insulated electric wire described as No. 5 except that a varnish prepared by dispersing the PMMA particles in the resin composition in such an amount that the resulting insulating layer had a calculated porosity of 50% by volume was used as the varnish for forming an insulating layer.

<Measurement of dielectric constant>

Figure 4:
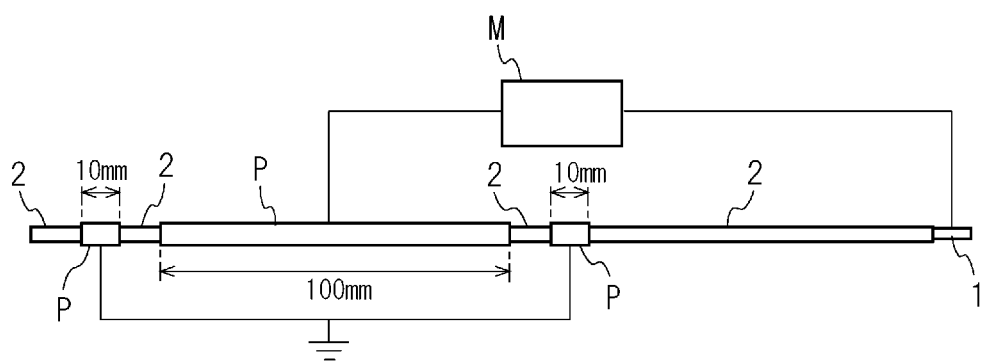
FIG. 4 is a schematic view illustrating a method for measuring a dielectric constant in Examples.

Regarding the insulated electric wires of Nos. 1 to 9, a dielectric constant ε of the insulating layer 2 was measured. FIG. 4 is a schematic view illustrating a method for measuring the dielectric constant. In FIG. 4, an insulated electric wire is assigned the same reference numerals as those in FIG. 1. First, a sample for measurement was prepared in which a silver paste P was applied to three portions of a surface of an insulated electric wire, and an insulating layer 2 at one end of the insulated electric wire was peeled to expose a conductor 1. Here, the application lengths of the silver pastes P applied to the three portions of the surface of the insulated electric wire in the longitudinal direction of the insulated electric wire were set to 10 mm, 100 mm, and 10 mm, respectively, in the longitudinal direction. The silver pastes P applied to the two portions so as to have a length of 10 mm were connected to the ground, and the capacitance between the exposed conductor 1 and the silver paste P applied between the silver pastes of the two portions and having a length of 100 mm was measured with an LCR meter M. The dielectric constant ε of the insulating layer 2 was calculated from the measured capacitance and the thickness of the insulating layer 2 of 30 μm. The measurement of the dielectric constant ε was performed in n (number of test samples)=3 after heating at 105° C. for one hour, and the average of the measured values was determined. Table 1 shows the measurement results of the dielectric constant ε.

<Evaluation of Coating Property>

Regarding the insulated electric wires of Nos. 1 to 9, the insulating layer was peeled from the conductor in the form of a tube, and tensile strength [N/mm$^2$] at break of the coating of the tubular insulating layer was measured with a tensile tester. The measurement of the tensile strength was performed in n (number of test samples)=5, and the average of the measured values was determined. Table 1 shows the measurement results of the tensile strength of the coating.

<Evaluation of Insulating Property>

Regarding the insulated electric wires of Nos. 1 to 9, a breakdown voltage was measured. Specifically, when an alternating voltage was applied between conductors of a twist pair wire and the voltage was increased at a rate of 500 V/sec, a voltage at which dielectric breakdown occurred was measured in accordance with JIS-C3216-5 (2011). The measurement of the breakdown voltage was performed in n (number of test samples)=5, and the average of the measured values was determined. Table 1 shows the measurement results of the breakdown voltage.

<Solvent Immersion Test>

In use of an insulated electric wire under the application of a high voltage, the insulated electric wire reaches a high temperature. In such a case, in order to cool the insulated electric wire, for example, the insulated electric wire may be used while being immersed in a solvent. A solvent immersion test was performed in order to confirm that a desired property was obtained even when an insulated electric wire was used while being immersed in a solvent. Specifically, the insulated electric wires of Nos. 1 to 9 were immersed in testing oil IRM 903 at 150° C. for 72 hours, and the dielectric constant ∈ of each of the insulated electric wires was then measured. This solvent immersion test was performed in n (number of test samples)=3. The average of the measured values was determined and compared with the dielectric constant ∈ before immersion in the solvent. Specifically, when the difference in dielectric constant ∈ between before and after the solvent immersion test was less than 0.05, it was considered that an increase in the dielectric constant was not observed, and the evaluation result was denoted by "A". When the difference determined by subtracting the dielectric constant ∈ before the solvent immersion test from the dielectric constant ∈ after the solvent immersion test was 0.05 or more and less than 0.2, it was considered that the dielectric constant slightly increased, and the evaluation result was denoted by "B". When the difference determined by subtracting the dielectric constant ∈ before the solvent immersion test from the dielectric constant ∈ after the solvent immersion test was 0.2 or more, it was considered that the dielectric constant significantly increased, and the evaluation result was denoted by "C". Table 1 show the evaluation results of the change in the dielectric constant ∈.

<Measurement of Partial Discharge Inception Voltage>

Regarding the insulated electric wires of Nos. 1 to 9, a partial discharge inception voltage (PDIV) was measured. Specifically, two electric wires were twisted, and when an alternating voltage was applied to both ends of the two insulated electric wires and the voltage was increased at a rate of 10 V/sec, a voltage at which a discharge of 50 pC or more continued for three seconds was determined as the partial discharge inception voltage. Table 1 shows the measurement results of the partial discharge inception voltage.

TABLE 1

| No. | Target porosity (vol %) | Dielectric constant ε | Tensile strength [N/mm²] | Breakdown voltage [kV] | Determination result of increase in dielectric constant | PDIV [V] |
| --- | --- | --- | --- | --- | --- | --- |
| 1 | 20 | 2.3 | 107 | 7.7 | A | 1010 |
| 2 | 40 | 2.0 | 65 | 5.6 | A | 1150 |
| 3 | 50 | 1.8 | 53 | 5.2 | A | 1230 |
| 4 | 0 | 2.9 | 208 | 12.5 | A | 890 |
| 5 | 10 | 2.6 | 166 | 9.5 | A | 960 |
| 6 | 20 | 2.4 | 108 | 7.6 | A | 1010 |
| 7 | 30 | 2.3 | 93 | 4.5 | A | 1070 |
| 8 | 40 | 2.1 | 74 | 4.0 | B | 1120 |
| 9 | 50 | 1.9 | 54 | 3.5 | C | 1180 |

[Evaluation Results]

The results in Table 1 show that, in a target porosity of 40% by volume or more, with an increase in the target porosity, the difference in dielectric constant ∈ between before and after the solvent immersion test increases in Nos. 8 and 9, in which the insulating layer was formed by using a varnish containing PMMA particles. This is probably because, in the insulated electric wires of Nos. 8 and 9, the number of pores that communicate with each other increases with the increase in the target porosity, and the solvent permeated into the communicating pores. In contrast, in Nos. 1 to 3, in which the insulating layer was formed by using a varnish containing hollow-forming particles, an increase in the dielectric constant ∈ compared with that before the solvent immersion test was not observed, showing that the dielectric constant ∈ is unlikely to change even when these insulated electric wires are immersed in the solvent. The results in Table 1 show that, in the insulated electric wires of Nos. 1 to 3, a decrease in the strength and the insulating property of the insulating layer can also be sufficiently suppressed. Accordingly, the insulated electric wires each including an insulating layer formed by using a varnish containing hollow-forming particles have good solvent resistance and thus can be suitably used as insulated electric wires used while being immersed in solvents.

REFERENCE SIGNS LIST

1 conductor
2 insulating layer
3 pore
4 outer shell
5 hollow-forming particle
6 core
7 shell
M LCR meter
P silver paste

The invention claimed is:

1. An insulated electric wire comprising
    a linear conductor and one or a plurality of insulating layers formed on an outer peripheral surface of the conductor,
    wherein at least one of the one or plurality of insulating layers contains a plurality of pores, the pores being formed from hollow particles, the hollow particles including outer shells, each of the outer shells being hollow inside, the outer shells being disposed on peripheries of the hollow particles, a main component of the outer shells being silicone that is 50% or more by mass of each of the outer shells, the hollow particle having a CV value of 30% or less, and
    a primer treatment layer is further disposed between the linear conductor and the insulating layer, the primer treatment layer containing one or a plurality of resins selected from polyimides, polyamide-imides, polyester-imides, polyesters and phenoxy resins,
    wherein the pores are flat spheres, the flat spheres having a shape with a ratio of a minor axis to a major axis of 0.95 or less on a section including the minor axis and the major axis where the major axis represents a maximum length of a diagonal passing through a centroid, and the minor axis represents a minimum length of the diagonal passing through the centroid, and a percentage of a number of the pores whose minor axes are oriented in a direction perpendicular to a surface of the conductor to a total number of the pores is 60% or more.

2. The insulated electric wire according to claim 1, wherein at least some of the outer shells have a defect including at least one of the following, wherein the defect is a crack, a gap, or a hole.

3. The insulated electric wire according to claim 1, wherein minor axes of the pores are oriented in a direction perpendicular to the surface of the conductor.

4. The insulated electric wire according to claim 1, wherein at least one insulating layer of the one or a plurality of the insulating layers contains a polyimide as a main component, the main component of the at least one insulating layer of the one or a plurality of the insulating layers being 50% or more by mass.

5. The insulated electric wire according to claim 1, wherein a porosity of the one or plurality of insulating layers is 10% by volume or more and 50% by volume or less, where the porosity is the percentage of the volume of pores relative to the volume of the one or plurality of insulating layers, where the volume of the one or plurality of insulating layers includes the volume of the pores.

6. The insulated electric wire according to claim 1, wherein the outer shells have an average thickness of between 0.01 μm and 0.5 μm.

7. The insulated electric wire according to claim 6, wherein the insulating layer having an average thickness that is between 5 μm and 200 μm.

\* \* \* \* \*